US012500701B2

(12) United States Patent
Wu

(10) Patent No.: US 12,500,701 B2
(45) Date of Patent: Dec. 16, 2025

(54) METHOD, TERMINAL AND NETWORK DEVICE FOR PDSCH TRANSMISSION IN A HARQ PROCESS WITH HARQ-ACK FEEDBACK

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 448 days.

(21) Appl. No.: 18/163,982

(22) Filed: Feb. 3, 2023

(65) Prior Publication Data

US 2023/0179345 A1    Jun. 8, 2023

Related U.S. Application Data

(63) Continuation of application No. PCT/CN2020/106672, filed on Aug. 3, 2020.

(51) Int. Cl.
*H04L 1/1829* (2023.01)
*H04W 56/00* (2009.01)

(52) U.S. Cl.
CPC .......... *H04L 1/1854* (2013.01); *H04L 1/1864* (2013.01); *H04W 56/0055* (2013.01)

(58) Field of Classification Search
CPC ............... H04L 1/1854; H04L 1/1864; H04W 56/0055; H04W 56/0045; H04B 7/18513
See application file for complete search history.

(56) References Cited

U.S. PATENT DOCUMENTS

2020/0044792 A1\* 2/2020 Vaidya ................ H04L 47/34
2020/0153490 A1    5/2020 Ko et al.
(Continued)

FOREIGN PATENT DOCUMENTS

WO    2020031155 A1    2/2020
WO    2020089867 A1    5/2020

OTHER PUBLICATIONS

ZTE, "Discussion on the enhancement of NTN," 3GPP TSG RAN WG1 #101, R1-2003560, May 2020.
(Continued)

*Primary Examiner* — Afshawn M Towfighi
(74) *Attorney, Agent, or Firm* — Hodgson Russ LLP

(57) ABSTRACT

Embodiments of the present invention provide a wireless communication method, a terminal device, and a network device, applicable to the technical field of communications. The embodiments of the present invention comprise: when a terminal device receives a first PDSCH transmitted by a network device by scheduling a first HARQ process, before a first moment, the terminal device does not expect to receive, again, a second PDSCH transmitted by the network device by scheduling the first HARQ process, wherein the first moment is determined according to a second moment, and the second moment is a transmission end moment when the terminal device sends, to the network device, first hybrid automatic repeat-request acknowledgement (HARQ-ACK) feedback information corresponding to the first PDSCH, or the second moment is a transmission end moment when the terminal device receives the first PDSCH.

7 Claims, 8 Drawing Sheets

(56) References Cited

U.S. PATENT DOCUMENTS

2020/0153500 A1    5/2020  Kim et al.
2023/0155747 A1*   5/2023  Choi .................... H04W 72/23
                                                       370/329
2023/0179345 A1*   6/2023  Wu ..................... H04B 7/18513
                                                       370/350

OTHER PUBLICATIONS

"3rd Generation Partnership Project; Technical Specification Group Radio Access Network; Solutions for NR to support non-terrestrial networks (NTN) (Release 16)," 3GPP TR 38.821, Dec. 2019, v16.0.0.

Mediatek Inc., "Summary Delay-tolerant re-transmission mechanisms in NR-NTN," 3GPP TSG RAN WG1 Meeting #96bis, R1-1905840, Apr. 2019.

WIPO, International Search Report and Written Opinion for PCT/CN2020/106672, May 8, 2021.

EPO, Extended European Search Report for EP Application No. 20948821.2, Aug. 18, 2023.

"3rd Generation Partnership Project; Technical Specification Group Radio Access Network; Study on New Radio (NR) to support non-terrestrial networks (Release 15)," 3GPP TR 38.811, Jul. 2020, v15.3.0.

EPO, Communication for EP Application No. 20948821.2, Dec. 6, 2024.

EPO, Communication for EP Application No. 20948821.2, May 16, 2024.

EPO, Communication for EP Application No. 20948821.2, Jul. 31, 2025.

* cited by examiner

METHOD, TERMINAL AND NETWORK DEVICE FOR PDSCH TRANSMISSION IN A HARQ PROCESS WITH HARQ-ACK FEEDBACK

CROSS-REFERENCE TO RELATED APPLICATION

This application is a continuation of International Application No. PCT/CN2020/106672, filed Aug. 3, 2020, the entire disclosure of which is incorporated herein by reference.

TECHNICAL FIELD

The present disclosure relates to the field of communication technology, and more particularly, to a wireless communication method, a terminal device and a network device.

BACKGROUND

In the TN network, since the timing advance (TA) is of microsecond magnitude and does not have much impact on the scheduling (usually not more than one slot), the scheduling restriction for the HARQ process in the new radio (NR) system is as follows: if the terminal device receives a PDSCH transmitted by the network device by scheduling a certain HARQ process, the terminal device does not expect to receive other PDSCH(s) transmitted by the network device by scheduling the certain HARQ process again, until the end of the transmission of the feedback information of the certain HARQ process corresponding to the PDSCH sent by the terminal device to the network device. In the NTN network, the timing advance (TA) is usually greater than or equal to one slot, so the existing scheduling restriction on the HARQ process is not applicable to the NTN network. Therefore, how to determine the scheduling restriction of the HARQ process in the Non-Terrestrial Network (NTN) is an urgent problem to be solved.

SUMMARY

The embodiments of the present disclosure provide a wireless communication method, a terminal device and a network device, which can solve the problem of how to restrict the scheduling of the HARQ process in the NTN network.

In a first aspect, a wireless communication method is provided, including:

in a case that a terminal device receives a first physical downlink shared channel (PDSCH) transmitted by a network device by scheduling a first hybrid automatic repeat request (HARQ) process, not expecting, by the terminal device, to receive a second PDSCH transmitted by the network device by scheduling the first HARQ process again before a first moment;

where the first moment is determined according to a second moment, and the second moment is a transmission end moment of sending first hybrid automatic repeat request acknowledgement (HARQ-ACK) feedback information corresponding to the first PDSCH from the terminal device to the network device, or the second moment is a transmission end moment of receiving the first PDSCH by the terminal device.

In a second aspect, a wireless communication method is provided, including:

in a case that a network device transmits a first PDSCH by scheduling a first hybrid automatic repeat request (HARQ) process to a terminal device, not transmitting, by the network device, a second PDSCH to the terminal device by scheduling the first HARQ process before a first moment;

where the first moment is a transmission end moment of receiving first hybrid automatic repeat request acknowledgement (HARQ-ACK) feedback information corresponding to the first PDSCH by the network device from the terminal device, or, the first moment is determined according to a second moment, where the second moment is a transmission end moment of sending the first PDSCH by the network device.

In a third aspect, a terminal is provided, including: a processing module, configured to, in a case that a terminal device receives a first physical downlink shared channel (PDSCH) transmitted by a network device by scheduling a first hybrid automatic repeat request (HARQ) process, not expect by the terminal device to receive a second PDSCH transmitted by the network device by scheduling the first HARQ process again before a first moment;

where the first moment is determined according to a second moment, and the second moment is a transmission end moment of sending first hybrid automatic repeat request acknowledgement (HARQ-ACK) feedback information corresponding to the first PDSCH from the terminal device to the network device, or the second moment is a transmission end moment of receiving the first PDSCH by the terminal device.

In a fourth aspect, a network device is provided, including: a processing module, configured to, in a case that a network device transmits a first PDSCH by scheduling a first hybrid automatic repeat request (HARQ) process to a terminal device, not transmit by the network device a second PDSCH to the terminal device by scheduling the first HARQ process before a first moment;

where the first moment is a transmission end moment of receiving first hybrid automatic repeat request acknowledgement (HARQ-ACK) feedback information corresponding to the first PDSCH by the network device from the terminal device, or, the first moment is determined according to a second moment, where the second moment is a transmission end moment of sending the first PDSCH by the network device.

In a fifth aspect, a terminal device is provided, including: a processor, a memory, and a computer program stored on the memory and operable on the processor, where the computer program is executed by the processor to implement the wireless communication method according to the first aspect.

In a sixth aspect, a network device is provided, including: a processor, a memory, and a computer program stored on the memory and operable on the processor, where the computer program is executed by the processor to implement the wireless communication method according to the second aspect.

In a seventh aspect, a computer-readable storage medium is provided, including: computer instructions, when the computer instructions are run on a computer, causing the computer to perform the wireless communication method according to the above first aspect or any optional implementation manner of the first aspect, or, to perform the wireless communication method according to the above second aspect or any optional implementation manner of the second aspect.

In an eighth aspect, a computer program product is provided, including: computer instructions, where when the computer program product is run on a computer, the computer executes the computer instructions, causing the computer to perform the wireless communication method according to the above first aspect or any optional implementation manner of the first aspect, or, to perform the wireless communication method according to the above second aspect or any optional implementation manner of the second aspect.

In a ninth aspect, a chip is provided, the chip is coupled with a memory in the terminal device, so that the chip calls the program instructions stored in the memory during operation, causing the terminal device to perform the wireless communication method according to the above first aspect or any optional implementation manner of the first aspect, or, causing the network device to perform the wireless communication method according to the above second aspect or any optional implementation manner of the second aspect.

In the embodiments of the present disclosure, when the terminal device receives the first PDSCH transmitted by the network device by scheduling the first HARQ process, the terminal device does not expect to receive a second PDSCH transmitted by the network device by scheduling the first HARQ process again before a first moment; where the first moment is determined according to a second moment, and the second moment is a transmission end moment of sending a first hybrid automatic repeat request acknowledgement (HARQ-ACK) feedback information corresponding to the first PDSCH from the terminal device to the network device, or the second moment is a transmission end moment of receiving the first PDSCH by the terminal device. Through this solution, the scheduling restriction of HARQ in the NTN network can be enhanced, and errors can be avoided when scheduling the HARQ process in the NTN system.

DETAILED DESCRIPTION

Figure 1A:
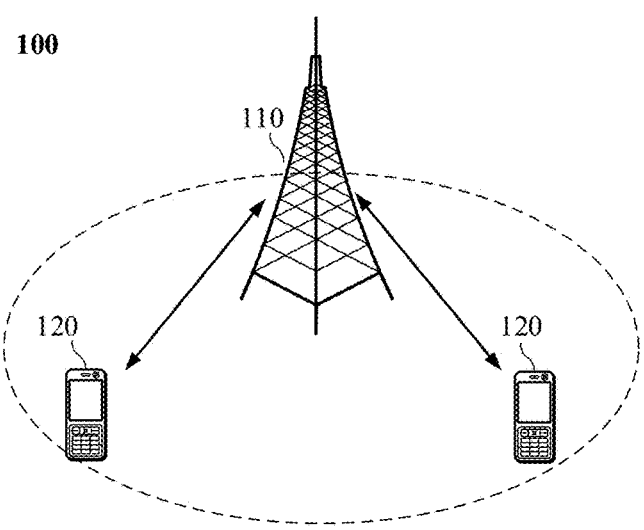
FIG. 1A is a first schematic diagram of an architecture of a wireless communication system provided by the embodiments of the present application.

The technical solutions in the embodiments of the present disclosure will be described below in conjunction with the accompanying drawings in the embodiments of the present disclosure. Obviously, the described embodiments are only a part of the embodiments of the present disclosure, and not all of them. Based on the embodiments of the present disclosure, all other embodiments obtained by those skilled in the art without creative efforts fall within the protection scope of the present application.

A brief description of some of the terms involved in this application is first given below as follows.

At present, the research on the next generation (New radio, NR) system mainly considers two frequency bands, namely, frequency band FR1 (Frequency range 1) and frequency band FR2 (Frequency range 2), where the FR1 and FR2 include the frequency domain ranges as shown in Table 1. It should be understood that the embodiments of the present application may be applied to the frequency bands FR1 and FR2, and may also be applied to other frequency bands, such as a frequency band from 52.6 GHz to 71 GHz, or a frequency band from 71 GHz to 100 GHz, which are not limited in this application.

TABLE 1

| Frequency band definition | Corresponding frequency range |
| --- | --- |
| FR1 | 410 MHz-7.125 GHz |
| FR2 | 24.25 GHz-52.6 GHz |

The research on the NR system includes Non Terrestrial Network (NTN) technology. NTN generally provides communication services to terrestrial users by using satellite communication. Compared with terrestrial cellular network communication, the satellite communication has many unique advantages. First of all, the satellite communication is not restricted by the user's geographical area. For example, general land communication cannot cover areas where communication devices cannot be set up, such as oceans, mountains, deserts, or areas where communication coverage is not available due to sparse population. As for the satellite communication, since a single satellite may cover a large area of ground, and the satellite may orbit around the earth, theoretically every corner of the earth can be covered by the satellite communication. Secondly, the satellite communication has great social value. The satellite communication can cover remote mountainous areas, poor and backward countries or regions at a lower cost, so that people in these regions can enjoy advanced voice communication and mobile Internet technology, which is conducive to narrowing the digital gap with developed regions and promoting development of these areas. Thirdly, the distance of satellite communication is long, and the cost of communication does not increase significantly with the increase of communication distance. Finally, the stability of satellite communication is high and not limited by natural disasters.

The communication satellites are divided into Low-Earth Orbit (LEO) satellite, Medium-Earth Orbit (MEO) satellite, Geostationary Earth Orbit (GEO) satellite and High Elliptical Orbit (HEO) satellite and so on according to their orbital altitudes. At the present stage, LEO and GEO are mainly studied.

For LEO satellites, the orbital altitude range is 500 km~1500 km, and the corresponding orbital period is about 1.5 hours~2 hours. The signal propagation delay of single-hop communication between terminals is generally less than 20 ms, and the maximum satellite visualization time is 20 minutes. The signal propagation distance is short, the link loss is low, and the transmitting power requirement for the terminal is not high.

For GEO satellites, the orbital altitude is 35786 km, and the rotation period around the earth is 24 hours. The signal propagation delay of single-hop communication between users is generally 250 ms.

In order to ensure the coverage of satellites and improve the system capacity of the entire satellite communication system, satellites use multi-beams to cover the ground. One satellite may form dozens or even hundreds of beams to cover the ground, and one satellite beam may cover a ground area with a diameter of tens to hundreds of kilometers.

Illustratively, FIG. 1A is a schematic diagram of the architecture of a communication system provided by the embodiments of the present application. As shown in FIG. 1A, the communication system 100 may include a network device 110, and the network device 110 may be a device that communicates with a terminal device 120 (or referred to as a communication terminal, terminal). The network device 110 may provide communication coverage for a specific geographical area, and may communicate with the terminal devices located in the coverage area.

FIG. 1A exemplarily shows one network device and two terminal devices. Optionally, the communication system 100 may include a plurality of network devices, and other numbers of terminal devices may be included in the coverage area of each network device, which is not limited by the embodiments of the present application.

Figure 1B:
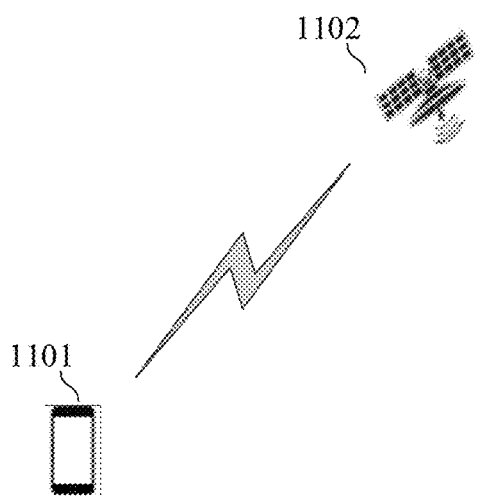
FIG. 1B is a first schematic diagram of the architecture of a wireless communication system provided by the embodiments of the present application.

Illustratively, FIG. 1B is a schematic diagram of the architecture of another communication system provided by the embodiments of the present application. Referring to FIG. 1B, a terminal device 1101 and a satellite 1102 are included, and wireless communication may be performed between the terminal device 1101 and the satellite 1102. The network formed between the terminal device 1101 and the satellite 1102 may also be referred to as NTN. In the architecture of the communication system shown in FIG. 1B, the satellite 1102 may function as a base station, and communication may be performed between the terminal device 1101 and the satellite 1102 directly. Under the system architecture, the satellite 1102 may be referred to as a network device. Optionally, the communication system may include a plurality of network devices 1102, and other numbers of terminal devices may be included in the coverage area of each network device 1102, which is not limited by the embodiments of the present application.

Figure 1C:
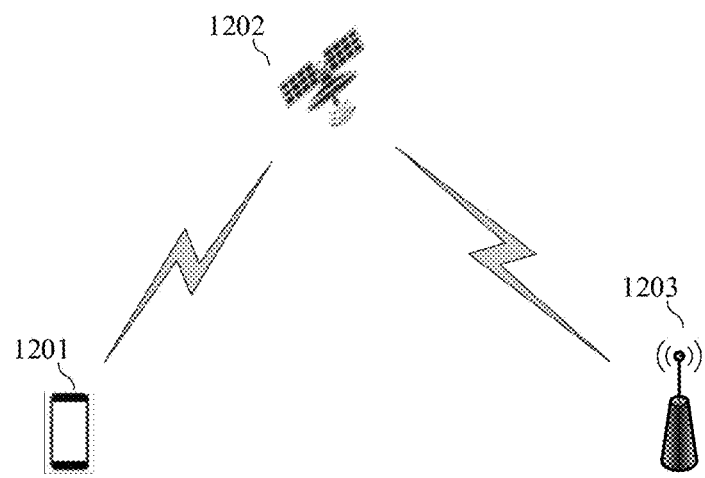
FIG. 1C is a first schematic diagram of the architecture of a wireless communication system provided by the embodiments of the present application.

Illustratively, FIG. 1C is a schematic diagram of the architecture of another wireless communication system provided by the embodiments of the present application. Referring to FIG. 1C, a terminal device 1201, a satellite 1202 and a base station 1203 are included, wireless communication may be performed between the terminal device 1201 and the satellite 1202, and communication may be performed between the satellite 1202 and the base station 1203. The network formed among the terminal device 1201, the satellite 1202 and the base station 1203 may also be referred to as NTN. In the architecture of the communication system shown in FIG. 3C, the satellite 1202 may not have the function of a base station, and the communication between the terminal device 1201 and the base station 1203 needs to be relayed through the satellite 1202. Under the system architecture, the base station 1203 may be referred to as a network device. Optionally, the communication system may include a plurality of network devices 1203, and other numbers of terminal devices may be included in the coverage area of each network device 1203, which is not limited by the embodiments of the present application.

It should be noted that FIG. 1A-FIG. 1C only illustrate the systems to which the present application applies in the form of examples. The methods shown in the embodiments of the present application may also be applied to other systems, such as 5G communication systems, LTE communication systems, etc., which is not specifically limited in the embodiments of the present application.

Optionally, the wireless communication system shown in FIG. 1A-FIG. 1C may further include other network entities such as a Mobility Management Entity (MME), an Access and Mobility Management Function (AMF), etc., which is not limited in the embodiments of the present application.

The embodiments of the present application describe various embodiments in conjunction with the network device and the terminal device, where the terminal device may also be referred to as a user equipment (UE), an access terminal, a user unit, a user station, a mobile station, a mobile, a remote station, a remote terminal, a mobile device, a user terminal, a terminal, a wireless communication device, a user agent, or a user apparatus, etc.

The terminal device may be a station (ST) in the WLAN, and may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, an in-vehicle device, a wearable device, a terminal device in next generation communication systems, such as NR networks, or a terminal device in future evolved Public Land Mobile Network (PLMN), etc.

In the embodiments of the present application, the terminal device may be deployed on land, including indoors or outdoors, handheld, wearable, or vehicle-mounted; and the terminal device may be deployed on water (e.g., ships, etc.), and in the air (e.g., on aircraft, balloons, satellites, etc.).

In the embodiments of the present application, the terminal device may be a mobile phone, a tablet computer (Pad), a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As an example but not a limitation, in the embodiments of the present application, the terminal device may also be a wearable device. The wearable device may also be referred to as a wearable smart device, which is a general term for wearable devices which are intelligently designed and developed for daily wear by applying wearable technology, such as glasses, gloves, watches, clothing and shoes. The wearable device is a portable device that is worn directly on the body, or integrated into the user's clothing or accessories. The wearable device is not only a hardware device, but also achieves powerful functions through software support, data interaction, and cloud interaction. Generalized wearable smart devices include full-featured and large-sized devices that can achieve complete or partial functions without relying on smartphones, such as smart watches or smart glasses, and devices that focus only on a certain type of application function and need to be used in conjunction with other devices (e.g., smartphones), such as various types of smart bracelets and smart jewelry for physical sign monitoring.

The network device may further include an access network device and a core network device. That is, the wireless communication system also includes a plurality of core networks for communicating with the access network devices. The access network device may be an evolved base station (evolutional node B, abbreviated as eNB or e-NodeB), a macro base station, a micro base station (also referred to as a "small base station"), a pico base station, an access point (AP), a transmission point (TP) or a new generation Node B (gNodeB), etc, in long-term evolution (LTE) system, next generation (mobile communication system) (next radio, NR) system or authorized auxiliary access long-term evolution (LAA-LTE) system.

In the embodiments of the present application, the network device may be a device used to communicate with the mobile device, and the network device may be an Access Point (AP) in WLAN, a base station (Base Transceiver Station, BTS) in GSM or CDMA, or a base station (NodeB, NB) in WCDMA, and may be an evolved base station (Evolutional Node B, eNB or eNodeB) in LTE, or a relay station or an access point, or a vehicle device, a wearable device, and may be a network device (gNB) in the NR network, or a network device in the future evolved PLMN network, or a network device in the NTN network, etc.

As an example but not a limitation, in the embodiments of the present application, the network device may have mobile characteristics, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station set up on land, water, and other positions.

In the embodiments of the present application, the network device may provide services for the cell, and the terminal device communicates with the network device through the transmission resources (for example, frequency domain resources, or spectrum resources) used by the cell. The cell may be a cell corresponding to a network device (such as a base station), and the cell may belong to a macro base station or a base station corresponding to a small cell, where the small cell may include: a Metro cell, a Micro cell, a Pico cell, a Femto cell, etc. These small cells have the characteristics of small coverage and low transmission power, and are suitable for providing high-speed data transmission services.

It should be understood that the devices with communication function in the network/system in the embodiments of the present application may be called communication devices. Taking communication systems as described herein as an example, a communication device may include a network device and a terminal device with communication functions, and the network device and the terminal device may be the specific devices described in the embodiments of the present disclosure, which will not be described here. The communication device may also include other devices in the communication system, such as a network controller, a mobility management entity and other network entities, which are not limited in the embodiments of the present application.

The technical solutions of the embodiments of the present application may be applied to various communication systems, for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) communication system or other communication systems, etc.

Generally speaking, the number of connections supported by conventional communication systems is limited and is easy to be implemented. However, with the development of communication technology, mobile communication systems will not only support conventional communication, but also support, for example, Device to Device (D2D) communication, Machine to Machine (M2M) communication, Machine Type Communication (MTC), Vehicle to Vehicle (V2V) communication, or Vehicle to everything (V2X) etc. The embodiments of the present application may also be applied to these communication systems.

The communication system in the embodiments of the present application may be applied to a Carrier Aggregation (CA) scenario, a Dual Connectivity (DC) scenario and may also be applied to a Standalone (SA) network deployment scenario.

Optionally, the communication system in the embodiments of the present application may be applied to an unlicensed spectrum, where the unlicensed spectrum may also be considered as a shared spectrum; or, the communication system in the embodiments of the present application may also be applied to a licensed spectrum, where the licensed spectrum may also be considered as a non-shared spectrum.

Optionally, the embodiments of the present application may be applied to Non-Terrestrial Networks (NTN) system, and may also be applied to Terrestrial Networks (TN) system.

It should be understood that the terms "system" and "network" are often used interchangeably herein. The term "and/or" in the present disclosure is just an association relationship describing associated objects, which means that there may be three relationships. For example, A and/or B may indicate the following three conditions: A exists alone, A and B exist simultaneously, and B exists alone. In addition, the character "/" in the present disclosure generally indicates that the contextual objects are in an "or" relationship.

It should be understood that the "indicating" mentioned in the embodiments of the present application may be a direct indication, an indirect indication, or an indication that there is an association relationship. For example, A indicating B may mean that A directly indicates B, for example, B may be obtained through A; it may also indicate that A indirectly indicates B, for example, A indicates C, and B may be obtained through C; it may also indicate that there is an association between A and B.

In the description of the embodiments of the present application, the term "corresponding" may indicate that there is a direct or indirect correspondence between the two, or that there is an association between the two, or may be a relationship of indicating and being indicated, configuring and being configured, etc.

Optionally, the indication information in the embodiments of the present application includes physical layer signaling, such as at least one of downlink control information (DCI), radio resource control (RRC) signaling, and media access control control element (MAC CE).

Optionally, the high layer parameters or high layer signaling in the embodiments of the present application include at least one of radio resource control (RRC) signaling, and media access control control element (MAC CE).

The technical solutions of the present disclosure are further described below in the form of embodiments, and the embodiments of the present application include part or all of the following contents.

Similar to the NR system, in the NTN system, user equipment (UE) needs to consider the effect of TA when performing uplink transmission. Since the propagation delay in the system is relatively large, the range of the TA value is also relatively large. When the terminal device is scheduled to perform uplink transmission in slot n, the terminal device needs to consider the round trip time (RTT), and transmit in advance during uplink transmission, so that the signal arrives at the base station side in the uplink slot n at the base station side. Specifically, the timing relationship in the NTN system may include at least one of the following optional cases, which are as shown in FIG. 2 and FIG. 3 below, respectively.

Optionally, the downlink slots and the uplink slots of the network device are aligned.

Figure 2:
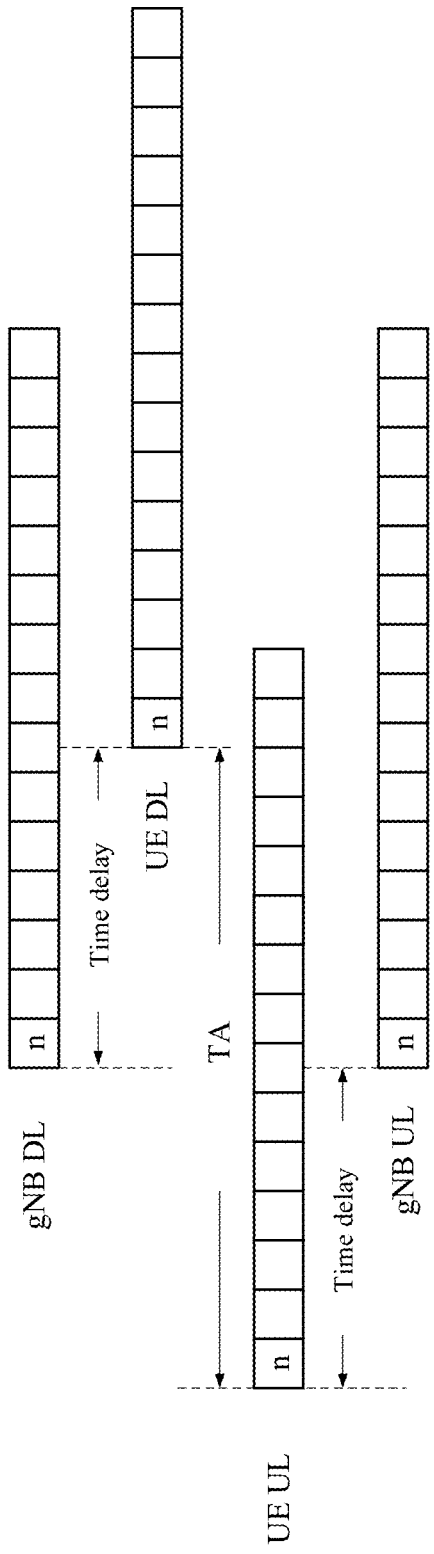
FIG. 2 is a first schematic diagram of a timing relationship in an NTN system provided by the embodiments of the present application.
Figure 3:
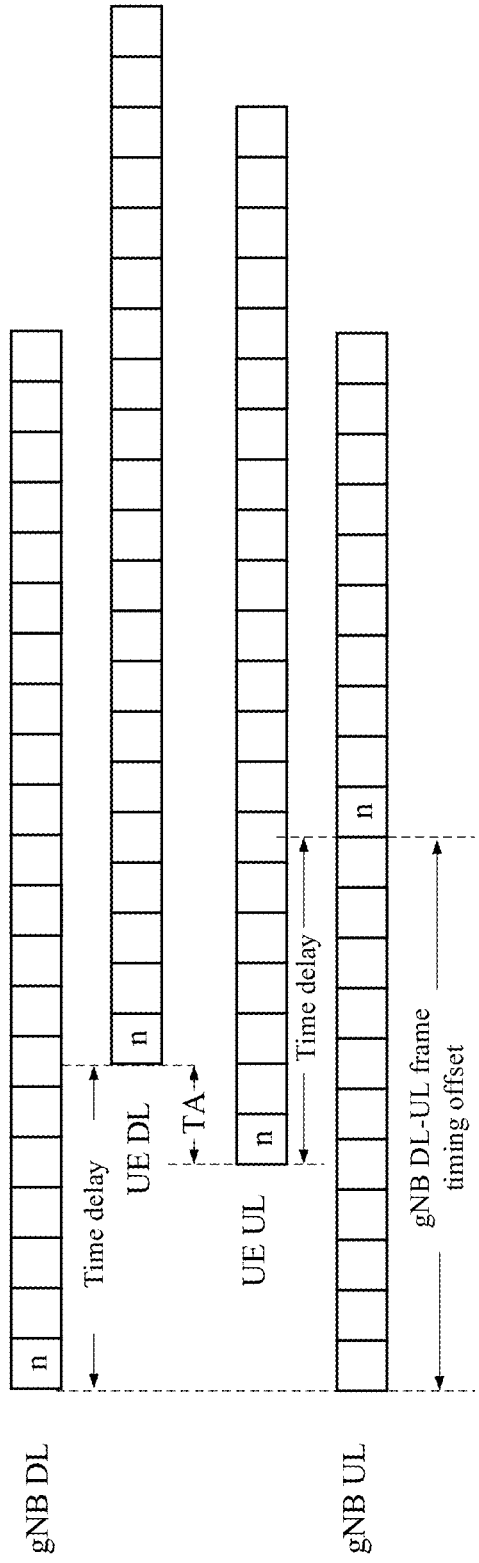
FIG. 3 is a second schematic diagram of a timing relationship in an NTN system provided by the embodiments of the present application.

As shown in FIG. 2, similar to NR system, the downlink slots and the uplink slots of the network device are aligned, but the downlink slots of the terminal device and the uplink slots of the terminal device are not aligned. In order to align the uplink transmission of the terminal device with the uplink slots of the network device, the terminal device needs to use a relatively large TA value. When performing uplink transmission, a relatively large offset value also needs to be introduced, for example, the TA value as shown in FIG. 2. In some cases, the TA value may also be used to determine the $K_{offset}$ value.

It should be noted that, in the figures of the embodiments of the present disclosure, the downlink slots or the timing sequence corresponding to the downlink slots of the network device are represented as gNB DL in the figures; the uplink slots or the timing sequence corresponding to the uplink slots of the network device are represented as gNB UL in the figures; the downlink slots or the timing sequence corresponding to the downlink slots of the terminal device are represented as UE DL in the figures; and the uplink slots or the timing sequence corresponding to the uplink slots of the terminal device are represented as UE UL in the figures.

Optionally, there is an offset value between the downlink slots of the network device and the uplink slots of the network device (i.e., the gNB DL-UL frame timing offset shown in FIG. 3).

As shown in FIG. 3, there is an offset value between the downlink slots of the network device and the uplink slots of the network device. In this case, the terminal device only needs to use a relatively small TA value if the uplink transmission of the terminal device needs to be aligned with the uplink slots of the network device. However, in this case, the network device may need additional scheduling complexity to handle the corresponding scheduling timing sequence.

In terrestrial communication system, the propagation delay of signal communication is usually less than 1 ms. In the NTN system, due to the long communication distance between the terminal device and the satellite (or the network device), the propagation delay of signal communication is very large and may range from tens of milliseconds to hundreds of milliseconds, depending on the satellite orbit altitude and the type of satellite communication service. In order to deal with the relatively large propagation delay, the uplink transmission timing sequence of the terminal device in the NTN system needs to be enhanced compared with the NR system.

The transmission timing sequence for transmitting HARQ-ACK feedback information on the physical uplink control channel (PUCCH) in the NR system is as follows: for the slots of PUCCH transmission, if the end position of receiving a physical downlink shared channel (PDSCH) is at slot n, or the end position of receiving a PDCCH which indicates to release the SPS PDSCH is at slot n, the terminal device shall transmit the corresponding HARQ-ACK feedback information on the PUCCH resource in slot n+K1.

The hybrid automatic repeat request acknowledgment (HARQ-ACK) feedback information includes: ACK information, or NACK information; K1 is the number of slots, which can be indicated by the HARQ feedback timing sequence indicator (PDSCH-to-HARQ-timing-indicator) information field in the DCI format, or, the number of slots is provided by the HARQ feedback timing sequence set (e.g. dl-DataToUL-ACK parameter). When K1=0, the last slot corresponding to PUCCH transmission overlaps with the slot for receiving PDSCH, or, the last slot corresponding to PUCCH transmission overlaps with the slot for receiving PDCCH which is used to indicate the release of semi-persistent scheduling (SPS).

In order to work normally in the NTN system, or in other words, in order to overcome the large round trip time in the NTN system, the above timing sequence relationship needs to be enhanced. For example, an offset parameter $K_{offset}$ is introduced into the system, and the parameter is applied to the relevant timing sequence relationship.

That is, the transmission timing sequence for transmitting HARQ-ACK on PUCCH is as follows: for the slot for transmitting PUCCH, the terminal device shall transmit the corresponding HARQ-ACK information on the PUCCH resource in the slot $n+K_1+K_{offset}$.

NR includes at least two levels of retransmission mechanisms:
1. The HARQ mechanism of medium access control (MAC) layer.
2. The automatic repeat request (ARQ) mechanism of the radio link control (RLC) layer.

The retransmission of lost or erroneous data is mainly handled by the HARQ mechanism of the MAC layer, and is supplemented by the retransmission function of the RLC layer. The HARQ mechanism of the MAC layer can provide fast retransmission, and the ARQ mechanism of the RLC layer can provide reliable data transmission.

The HARQ uses the stop-and-wait protocol to send data. In the stop-and-wait protocol, the sender stops and waits for acknowledgment information after sending one transport block (TB). In this way, the sender stops and waits for acknowledgment after each transmission, which will cause the user throughput to be quite low. Therefore, NR uses a plurality of parallel HARQ processes. When one HARQ process is waiting for acknowledgment information, the sender may use another HARQ process to continue sending data. These HARQ processes together form one HARQ entity, which combines with the stop-and-wait protocol to allow continuous data transmission. HARQ can be divided into uplink HARQ and downlink HARQ, where uplink HARQ is for uplink data transmission, and downlink HARQ is for downlink data transmission, they are independent from each other.

Based on the provisions of the current NR protocol, corresponding to each serving cell, the terminal device has its own HARQ entity. Each HARQ entity maintains a set of parallel downlink HARQ processes and a set of parallel uplink HARQ processes. Currently, each uplink carrier and downlink carrier supports a maximum of 16 HARQ processes. The base station may indicate the maximum number of HARQ processes to the terminal device through RRC signaling semi-static configuration according to the deployment situation of the network device. If the network device does not provide the corresponding configuration parameter, the default number of HARQ processes for the downlink is 8, and the maximum number of HARQ processes supported by each carrier for the uplink is always 16. Each HARQ process corresponds to one HARQ process ID. For the downlink, the broadcast control channel (BCCH) uses one dedicated broadcast HARQ process. For the uplink, HARQ ID 0 is used for the transmission of message 3 (Msg3) in the random process.

The terminal device detects the DCI according to the configured DCI format 1_0, DCI format 1_1 or DCI format 1_2 and performs PDSCH decoding according to the scheduling of the DCI. If the terminal device receives a first PDSCH transmitted by a network device by scheduling a HARQ process, the terminal device does not expect to receive a second PDSCH transmitted by the network device by scheduling the HARQ process again, before the end of transmission of sending HARQ-ACK feedback information corresponding to the PDSCH by the terminal device. The transmission timing sequence for the terminal device to send the HARQ-ACK feedback information to the network device is determined according to an HARQ feedback timing sequence set, where the HARQ feedback timing sequence set may be preset or configured by the network device.

For example, for the PDSCH scheduled by DCI format 1_0, the HARQ feedback timing sequence set is preset; for the PDSCH scheduled by DCI format 1_1 or DCI format 1_2, the HARQ feedback timing sequence set may be configured by the network device. The preset HARQ feedback timing sequence set includes a plurality of values, and the HARQ feedback timing sequence set configured by the network device may include one or more values.

If the HARQ feedback timing sequence set includes one value, the transmission timing sequence for the terminal device to feed back the HARQ-ACK feedback information is determined according to the configured value in the HARQ feedback timing sequence set.

If the HARQ feedback timing sequence set includes a plurality of values, the DCI format includes HARQ feedback timing sequence indicator (PDSCH-to-HARQ feedback timing indicator) information, and the HARQ feedback timing sequence indicator information is used to dynamically indicate the time domain position of the HARQ feedback resource from the HARQ feedback timing sequence set, such as the slot of the HARQ feedback resource, which is usually represented by K1.

Illustratively, the HARQ feedback timing sequence set includes 8 values, and the HARQ feedback timing indicator information includes 3 bits. When the HARQ feedback timing indicator information is 000, it indicates the first value in the HARQ feedback timing sequence set. When the HARQ feedback timing indication information is 001, it indicates the second value in the HARQ feedback timing sequence set, and so on. The transmission timing sequence for the terminal device to feed back the HARQ-ACK is determined according to the configured value in the HARQ feedback timing sequence set indicated by the HARQ feedback timing sequence indicator information in the DCI.

Figure 4:
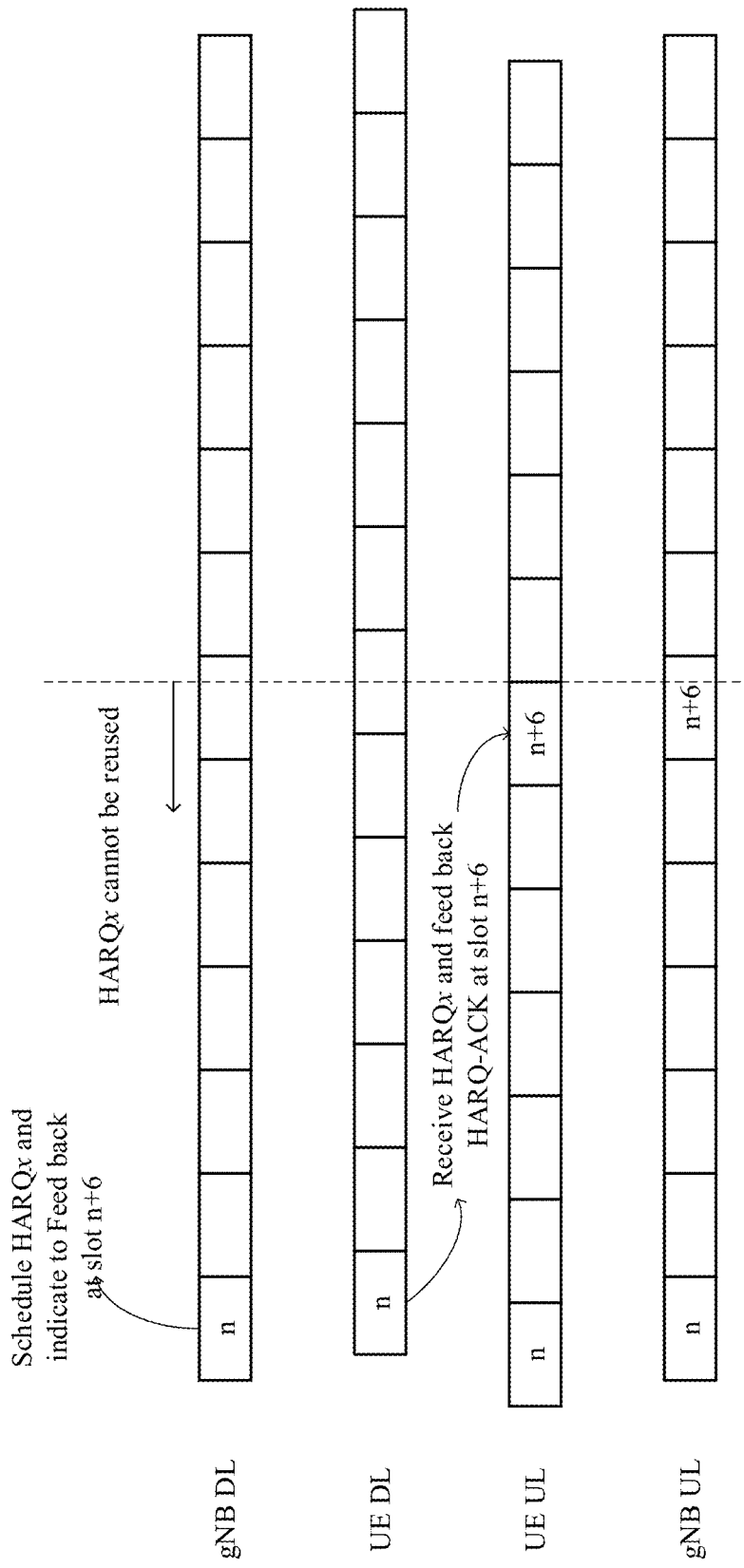
FIG. 4 is a first schematic diagram of a feedback and reuse timing sequence of a HARQ process provided by the embodiments of the present application.

Illustratively, as shown in FIG. 4, the network device sends the PDSCH transmitted by scheduling HARQ process x to the terminal device on slot n, the terminal device receives the PDSCH transmitted by the network device by scheduling and using HARQ process x on slot n, and the terminal device is instructed to feed back the HARQ-ACK feedback information corresponding to the PDSCH on slot n+6. Therefore, the terminal device transmits the HARQ-ACK feedback information corresponding to the PDSCH on slot n+6, and before the end of the transmission of the HARQ-ACK feedback information, the terminal device does not expect to receive a PDSCH transmitted by the network device by scheduling and using the HARQ process x again.

In the scheduling process based on the HARQ process in the terrestrial communication system (TN) network, it is assumed that the terminal device receives the PDSCH transmitted by the network device by scheduling and using HARQ process x on slot n in the downlink slots, and that the terminal device is instructed to feed back the HARQ-ACK feedback information corresponding to the PDSCH on slot n+6, where the HARQ-ACK feedback information includes ACK information or NACK information. Therefore, the terminal device transmits the HARQ-ACK feedback information corresponding to the PDSCH on slot n+6 in the uplink slots, so that the network device side may receive the HARQ-ACK feedback information corresponding to the PDSCH at slot n+6. The uplink slots of the terminal device have a TA offset with respect to the downlink slots of the terminal device, or in other words, the effect of TA needs to be considered for the uplink slots of the terminal device with respect to the downlink slots of the terminal device. The uplink slots and downlink slots of the network device are aligned. The downlink slots of the terminal device are delayed by a one-way transmission delay with respect to the downlink slots of the network device, and the uplink slots of the terminal device are ahead of the uplink slots of the network device by a one-way transmission time delay.

After receiving the ACK or NACK information fed back by the terminal device for the HARQ process x at slot n+6, the network device may reschedule the HARQ process x according to the feedback information. For example, if the ACK is received, the network device may use HARQ process x to schedule the transmission of new data, or, if the NACK is received, the network device may use HARQ process x to schedule a retransmission of transport block (TB) transmitted using HARQ process x on slot n. Since the network device can determine whether to use the HARQ process x to schedule the transmission of new data or to schedule the retransmission of previously transmitted data only after receiving the HARQ-ACK feedback information from the terminal device at slot n+6, the terminal device therefore does not expect to receive the downlink transmission scheduled by the network device using the HARQ process x before the network device receives the HARQ-ACK feedback information.

Figure 5:
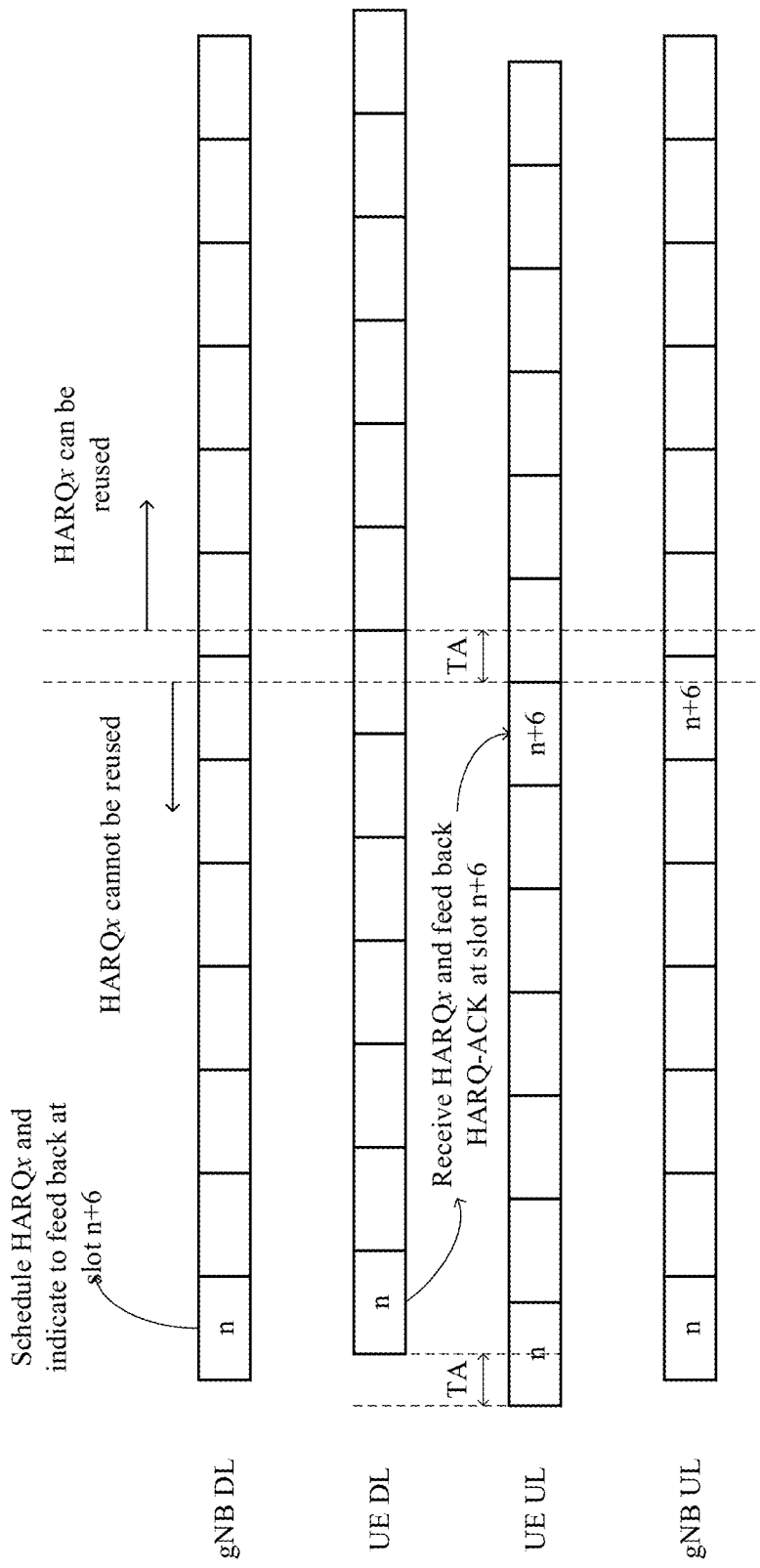
FIG. 5 is a second schematic diagram of a feedback and reuse timing sequence of a HARQ process provided by the embodiments of the present application.

FIG. 5 shows the feedback and reuse timing sequence of HARQ process in the NR system. Assuming that the network device reuses the HARQ process x to schedule the downlink transmission of the terminal device at the slot n+7 immediately after receiving the HARQ-ACK feedback information at the slot n+6, then a time difference between the moment when the terminal device may receive again the transmission by scheduling HARQ process x and the end moment of sending the HARQ-ACK feedback information by the terminal device is TA.

In the TN network, since TA is of microsecond magnitude (e.g., usually it does not exceed one symbol, and at most it does not exceed one slot) and does not have much impact on the scheduling, in the NR system, if the terminal device receives the PDSCH transmitted by the network device by scheduling the HARQ process x, the terminal device does not expect to receive another PDSCH transmitted by the network device by scheduling the HARQ process x again before the end of transmission of sending the HARQ-ACK feedback information corresponding to the PDSCH from the terminal device to the network device.

In the NTN system, since the communication distance between the terminal device and the satellite (or network device) is quite long, the round trip time (RTT) of signal transmission is very large. In the GEO system, the RTT of signal transmission may be in the order of hundreds of milliseconds, for example, the maximum RTT of signal transmission may be about 600 ms. In the LEO system, the RTT of signal transmission may be in the order of tens of milliseconds. Since the RTT of the NTN system is much greater than the RTT of the terrestrial communication system, in the NTN system, the above-mentioned HARQ scheduling restriction in the TN network is no longer applicable and needs to be enhanced, so as to ensure that the HARQ processes can be correctly scheduled in the NTN network.

Based on the above problems, the embodiments of the present application provide a wireless communication method. In the method, when a terminal device receives a first physical downlink shared channel (PDSCH) transmitted by a network device by scheduling a first HARQ process, the terminal device does not expect to receive again a second PDSCH transmitted by the network device by scheduling the first HARQ process before a first moment; where the first moment is determined according to a second moment, and the second moment is a transmission end moment of sending first HARQ-ACK feedback information corresponding to the first PDSCH from the terminal device to the network device, or the second moment is a transmission end moment of receiving the first PDSCH by the terminal device. Through this solution, the scheduling restriction of HARQ process in the NTN network can be enhanced, and errors can be avoided when scheduling the HARQ process in the NTN system.

Figure 6:
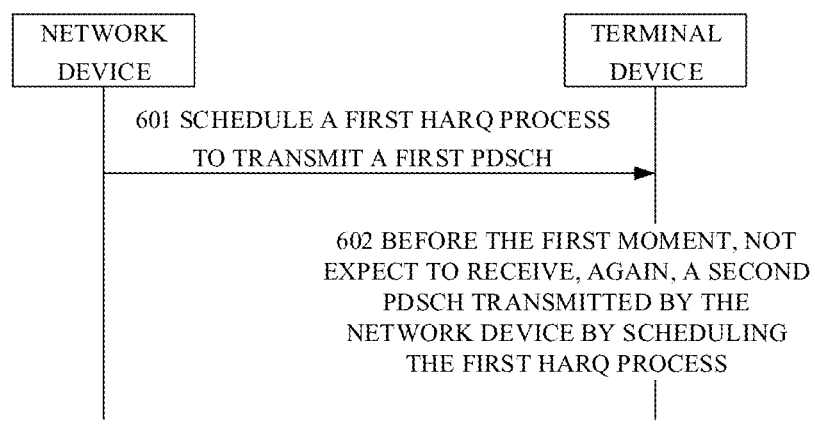
FIG. 6 is a first schematic diagram of a wireless communication method provided by the embodiments of the present application.

As shown in FIG. 6, a wireless communication method provided by the embodiments of the present application includes the following steps.

In 601, a terminal device receives a first PDSCH transmitted by a network device by scheduling a first HARQ process.

In 602, the terminal device does not expect to receive a second PDSCH transmitted by the network device by scheduling the first HARQ process again before a first moment.

For the terminal device, the first moment is determined according to a second moment.

It should be understood that, in the method provided by the embodiments of the present application, if a certain moment is a moment in the uplink slots of the terminal device, it may mean that the moment is a moment in the timing sequence corresponding to the uplink slots of the terminal device. If a certain moment is a moment in the downlink slots of the terminal device, it may mean that the moment is a moment in the timing sequence corresponding to the downlink slots of the terminal device.

Optionally, the advanced amount of the uplink slots of the terminal device relative to the downlink slots of the terminal device is TA.

Optionally, the second moment may include at least one of the following possible cases:

(1) the second moment is the transmission end moment of sending the first hybrid automatic repeat request acknowledgement (HARQ-ACK) feedback information corresponding to the first PDSCH from the terminal device to the network device.

Optionally, one possible case in the above mentioned case (1) is as follows: the second moment is a moment in an uplink slot of the terminal device, and the first moment is a moment in a downlink slot of the terminal device corresponding to the second moment. For example, assuming that the second moment is the end moment of the last symbol in the uplink slot n+K1+$K_{offset}$ of the terminal device, then the first moment is the end moment of the last symbol in the downlink slot n+K1+$K_{offset}$ of the terminal device.

Optionally, a time length that the second moment is advanced relative to the first moment is a length of timing advance (TA).

Optionally, another possible case in the above mentioned case (1) is as follows: the first moment is determined according to the second moment and a first duration.

Optionally, the second moment is a moment in an uplink slot of the terminal device, and/or the first moment is a moment in an uplink slot of the terminal device.

Optionally, the first duration is determined according to first information, and the first information includes at least one of the following:

a length of TA, an offset parameter and a Round Trip Time (RTT);

where the offset parameter is a slot offset of the uplink slot of the terminal device relative to a downlink slot of the terminal device, or, the offset parameter is an offset value of an uplink transmission timing sequence of the terminal device. For example, the offset parameter is the above mentioned $K_{offset}$.

Optionally, the above offset parameter may be preset.

Optionally, the above offset parameter is determined according to first indication information of the network device.

Optionally, the unit of the above offset parameter is slot or sub-slot.

Optionally, the unit of the length of TA is millisecond or microsecond.

Optionally, the first information is preset, or, the first information is determined according to first indication information of the network device.

Optionally, the first duration is preset, or, the first duration is determined according to second indication information of the network device.

(2) The second moment is the transmission end moment of receiving the first PDSCH by the terminal device.

Optionally, the second moment is a moment in a downlink slot of the terminal device.

Optionally, the first moment is a moment in a downlink slot of the terminal device.

Optionally, the second duration is a time length between the second moment and the first moment.

Optionally, the first moment is determined according to the second moment and the second duration.

Optionally, the second duration is determined according to HARQ feedback timing sequence information.

Optionally, the HARQ feedback timing sequence information is determined according to a K1 value and/or an offset parameter, where the offset parameter is a slot offset of an uplink slot of the terminal device relative to the downlink slot of the terminal device, or, the offset parameter is an offset value of an uplink transmission timing sequence of the terminal device.

The above determination of the HARQ feedback timing sequence information includes the followings.

In an optional implementation manner, the HARQ feedback timing sequence information is determined according to $K1+K_{offset}$.

It is determined by combining the two parameters K1 and $K_{offset}$. For example, if $K_{offset}=13$, and the network device indicates K1=5, it may be determined that the HARQ feedback timing sequence information is 18 slots.

In another optional implementation manner, the HARQ feedback timing sequence information is determined according to K1. Optionally, the network device has considered the effect of the offset parameter when indicating the HARQ feedback timing sequence through K1. For example, the network device indicates K1=18, where K1 includes the size of the offset parameter corresponding to TA, or in other words, the indicated K1 value already includes Koffset. For example, $K_{offset}$ is 13 slots.

Optionally, the first HARQ-ACK feedback information includes: an ACK, or, a NACK. For example, the first HARQ-ACK feedback information is ACK information or NACK information obtained by decoding the first PDSCH.

Optionally, the first PDSCH includes at least one of the following three cases:
(1) a scheduled PDSCH;
(2) a Semi-Persistent Scheduling (SPS) PDSCH; and
(3) a scheduled PDSCH and a Semi-Persistent Scheduling (SPS) PDSCH.

Optionally, the above terminal device is a terminal device in the NTN system, and the above network device is a network device in the NTN system.

When a terminal device receives a first PDSCH transmitted by a network device by scheduling a first HARQ process, the terminal device does not expect to receive a second PDSCH transmitted by the network device by scheduling the first HARQ process again before a first moment.

Figure 7:
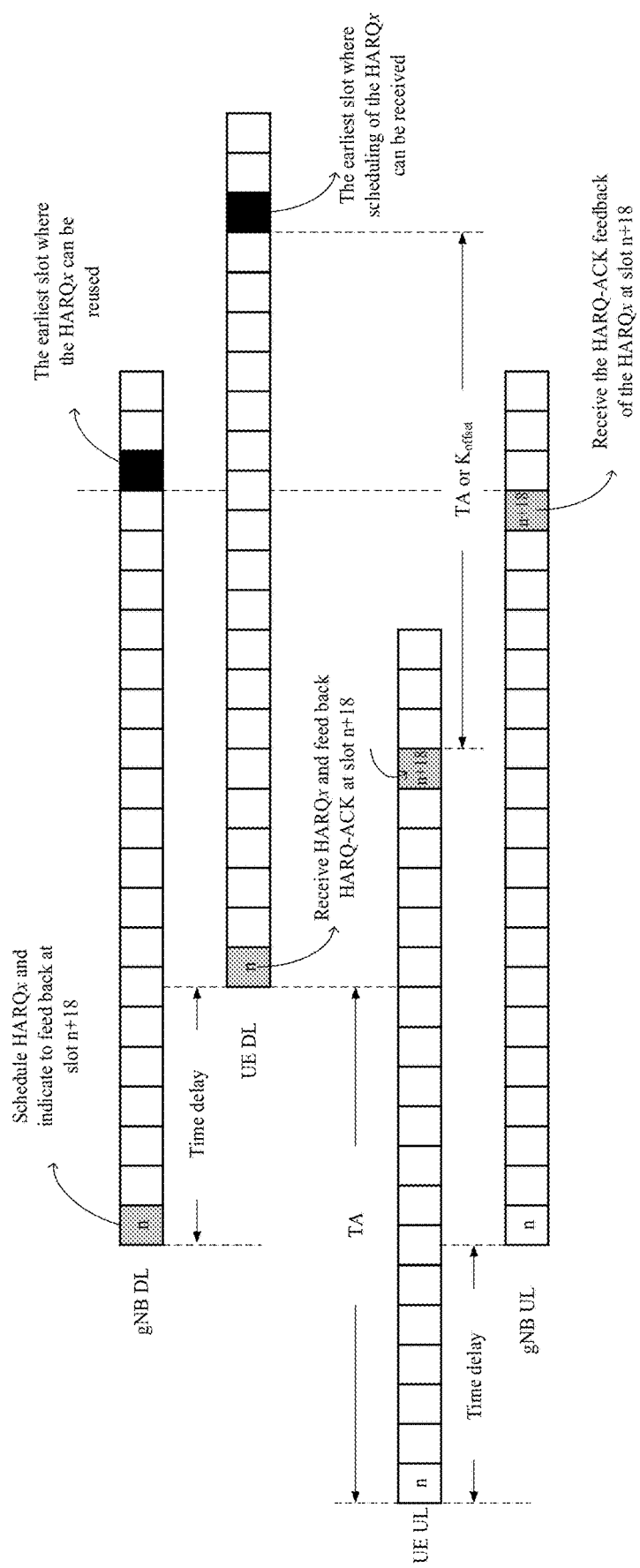
FIG. 7 is a third schematic diagram of a feedback and reuse timing sequence of a HARQ process provided by the embodiments of the present application.

Illustratively, FIG. 7 illustrates a feedback and reuse timing sequence of a HARQ process in the NTN system. The uplink slots and downlink slots of the network device are aligned. The downlink slots of the terminal device are delayed by a one-way transmission delay from the downlink slots of the network device, and the uplink slots of the terminal device are ahead of the uplink slots of the network device by a one-way transmission time delay. The uplink slots of the terminal device have an offset of TA with respect to the downlink slots of the terminal device, or in other words, the effect of TA needs to be considered for the uplink slots of the terminal device with respect to the downlink slots of the terminal device. In this example, the length of the TA is about 13 slots, or the value of the offset parameter $K_{offset}$ is 13. Correspondingly, the one-way transmission delay is about 6.5 slots.

Assuming that the terminal device receives the first PDSCH transmitted by the network device by scheduling and using the HARQ process x (which can be understood as the first HARQ process in the embodiments of the present application) at slot n in the downlink slots of the terminal device, and is instructed to feed back the HARQ-ACK feedback information corresponding to the first PDSCH at slot n+18, the terminal device may transmit the HARQ-ACK feedback information at the slot n+18 in the uplink slots of the terminal device, so that the network device may receive the HARQ-ACK feedback information at the slot n+18 in the uplink slots of the network device.

After the network device receives the ACK or NACK fed back by the terminal device for the HARQ process x at slot n+18 in the uplink slots of the network device, the network device may reschedule the HARQ process x according to the feedback information. For example, if the ACK is received, the network device may use HARQ process x to schedule the transmission of new data, or, if the NACK is received, the network device may use HARQ process x to schedule a retransmission of transport block (TB) transmitted using HARQ process x on slot n.

Since the network device can determine whether to schedule the transmission of new data or to schedule the retransmission of previously transmitted data by using the HARQ process x only after receiving the HARQ-ACK feedback information sent by the terminal device at slot n+18 in the uplink slots of the network device, it is assumed that the network device reuses the HARQ process x to schedule the downlink transmission of the terminal device at the slot n+19 in the downlink slots of the network device immediately after receiving the HARQ-ACK feedback information at the slot n+18 in the uplink slots of the network device, then the slot where the terminal device may receive again the transmission by scheduling HARQ process x is the slot n+19 in the downlink slots of the terminal device.

Illustratively, for the case where the second moment is the transmission end moment of sending the first hybrid automatic repeat request acknowledgement (HARQ-ACK) feedback information corresponding to the first PDSCH from the terminal device to the network device, the second moment is a moment in an uplink slot of the terminal device, and the first moment is a moment in a downlink slot of the terminal device corresponding to the second moment, in the above mentioned FIG. 7, the second moment may be the end moment of transmission of the HARQ-ACK in the slot n+18 in the uplink slots of the terminal device. In FIG. 7, the above-mentioned first moment is a moment in downlink slot n+18 that is corresponding to the end moment of transmission of the HARQ-ACK in the slot n+18 in the uplink slots of the terminal device. That is, in the embodiments of the present application, the terminal device does not expect to receive a second PDSCH transmitted by the network device by scheduling the first HARQ process again before the moment in the slot n+18 in the downlink slots of the terminal device.

Illustratively, for the case where the second moment is the transmission end moment of sending the first HARQ-ACK feedback information corresponding to the first PDSCH from the terminal device to the network device, and the first moment is determined according to the second moment and a first duration, in the above mentioned FIG. 7, the second moment may be the end moment of transmission of the HARQ-ACK in the slot n+18 in the uplink slots of the terminal device. The terminal device may determine that the above mentioned first moment is the corresponding moment in downlink slot n+18 of the terminal device according to the end moment of the transmission of HARQ-ACK in the slot n+18 in conjunction with the first duration (where the first duration is determined according to TA length, offset parameter or RTT).

Illustratively, for the case where the second moment is the transmission end moment of receiving the first PDSCH by the terminal device, and the first moment is determined according to the second moment and a second duration, in the above mentioned FIG. 7, the second moment may be the end moment of transmission of the first PDSCH in the slot n in the downlink slots of the terminal device. The terminal device may determine that the above mentioned first moment is the corresponding moment in the downlink slot n+18 of the terminal device according to the end moment of the transmission of first PDSCH in the slot n in conjunction with the second duration (i.e., the TA or $K_{offset}$ in the figure).

In the embodiments of the present application, when a terminal device receives a first PDSCH transmitted by a network device by scheduling a first HARQ process, the terminal device does not expect to receive a second PDSCH transmitted by the network device by scheduling the first HARQ process again before a first moment; where the first moment is determined according to a second moment, and the second moment is a transmission end moment of sending first hybrid automatic repeat request acknowledgement (HARQ-ACK) feedback information corresponding to the first PDSCH from the terminal device to the network device, or the second moment is a transmission end moment of receiving the first PDSCH by the terminal device. Through this solution, the scheduling restriction of HARQ in the NTN network can be enhanced, and errors can be avoided when scheduling the HARQ process in the NTN system.

Optionally, the embodiments of the present application further provide a wireless communication method, including: in the case that a terminal device receives a first PDSCH transmitted by a network device by scheduling a first HARQ process, the terminal device does not expect to receive a second PDSCH transmitted by the network device by scheduling the first HARQ process again before the end of a first time unit.

Optionally, the time unit may be one of a slot, a sub-slot and a symbol.

For the terminal device, the first time unit is determined according to a second time unit, and the second time unit may include the following two possible cases:

(1) the second time unit is the time unit of sending the first hybrid automatic repeat request acknowledgement (HARQ-ACK) feedback information corresponding to the first PDSCH by the terminal device to the network device, or, the second unit is the time unit corresponding to the end moment of sending the first HARQ-ACK feedback information corresponding to the first PDSCH by the terminal device to the network device.

Optionally, the second time unit is a time unit in an uplink slot of the terminal device, and the first time unit is a time unit in a downlink slot of the terminal device corresponding to the second time unit.

Optionally, a time length that the second time unit is advanced relative to the first time unit is a length of timing advance (TA).

Optionally, the first time unit is determined according to the second time unit and a first duration.

Optionally, the second time unit is a time unit in an uplink slot of the terminal device, and/or, the first time unit is a time unit in an uplink slot of the terminal device.

Optionally, the first duration is determined according to first information, and the first information includes at least one of the following:

a length of TA, an offset parameter and a Round Trip Time (RTT);

where the offset parameter is a slot offset of the uplink slot of the terminal device relative to a downlink slot of the terminal device, or, the offset parameter is an offset value of an uplink transmission timing sequence of the terminal device.

Optionally, the above offset parameter may be preset.

Optionally, the above offset parameter is determined according to first indication information of the network device.

Optionally, the first information is preset, or, the first information is determined according to first indication information of the network device.

Optionally, the first duration is preset, or, the first duration is determined according to second indication information of the network device.

(2) The second time unit is a time unit of receiving the first PDSCH by the terminal device, or the second time unit is a time unit corresponding to an end moment of receiving the first PDSCH by the terminal device.

Optionally, the second time unit is a time unit in a downlink slot of the terminal device, and the first time unit is determined according to a second time unit and a second duration.

Optionally, the first time unit is a time unit in a downlink slot of the terminal device, and the second duration is determined according to the HARQ feedback timing sequence information.

Optionally, the HARQ feedback timing sequence information is determined according to a $K_1$ value and/or an offset parameter.

The offset parameter is a slot offset of an uplink slot of the terminal device relative to the downlink slot of the terminal device, or, the offset parameter is an offset value of an uplink transmission timing sequence of the terminal device.

Optionally, the first HARQ-ACK feedback information includes: an ACK, or, a NACK.

Optionally, the first PDSCH includes at least one of the following three cases:

(1) a scheduled PDSCH;
(2) a Semi-Persistent Scheduling (SPS) PDSCH; and
(3) a scheduled PDSCH and a Semi-Persistent Scheduling (SPS) PDSCH.

Optionally, the above terminal device is a terminal device in the NTN system, and the above network device is a network device in the NTN system.

When a terminal device receives a first PDSCH transmitted by a network device by scheduling a first HARQ process, the terminal device does not expect to receive a second PDSCH transmitted by the network device by scheduling the first HARQ process again before the end of the first time unit.

Figure 8A:
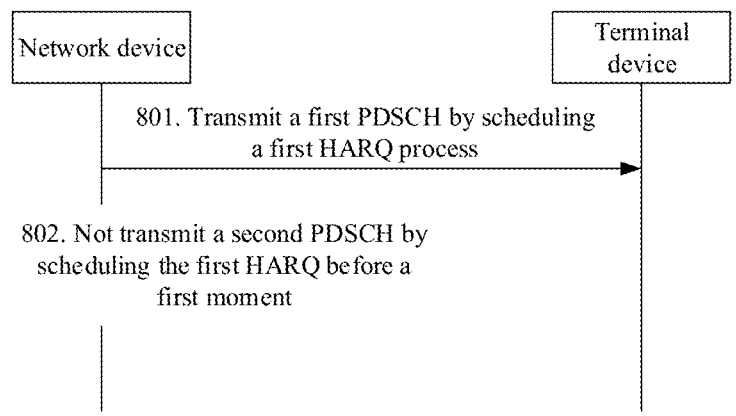
FIG. 8A is a second schematic diagram of a wireless communication method provided by the embodiments of the present application.

As shown in FIG. 8A, the present application provides a wireless communication method, including the following steps.

In 801, a network device transmits a first PDSCH to a terminal device by scheduling a first HARQ process.

In 802, the network device no longer transmits a second PDSCH to the terminal device by scheduling the first HARQ process before a first moment.

In the embodiments of the present disclosure, in the case that the network device transmits the first PDSCH by scheduling the first HARQ process to the terminal device, the network device no longer transmits a second PDSCH to the terminal device by scheduling the first HARQ process before the first moment.

Optionally, the foregoing first moment is a moment in an uplink slot of the network device.

For the network device, the first moment may be at least one of the following two cases:
(1) the first moment is a transmission end moment of receiving by the network device first HARQ-ACK feedback information corresponding to the first PDSCH sent by the terminal device.
(2) the first moment is determined according to the second moment.

It should be understood that, in the method of the embodiments of the present application, if a certain moment is a moment in the uplink slot of the network device, it may mean that the moment is a moment in the timing sequence corresponding to the uplink slots of the network device. If a certain moment is a moment in the downlink slot of the network device, it may mean that the moment is a moment in the timing sequence corresponding to the downlink slots of the network device.

Optionally, the downlink slots of the network device are aligned with the uplink slots of the network device.

Optionally, the second moment is a transmission end moment of sending the first PDSCH by the network device.

Optionally, the second moment is a moment in a downlink slot of the network device, and the first moment is determined according to the second moment and a second duration.

Optionally, the second duration is determined according to HARQ feedback timing sequence information.

Optionally, the HARQ feedback timing sequence information is determined according to a $K_1$ value and/or an offset parameter.

The offset parameter is an offset value of an uplink transmission timing sequence of the terminal device.

Optionally, the first HARQ-ACK feedback information includes: an ACK, or, a NACK.

Optionally, the first PDSCH includes at least one of the following three cases:
(1) a scheduled PDSCH;
(2) a Semi-Persistent Scheduling (SPS) PDSCH; and
(3) a scheduled PDSCH and Semi-Persistent Scheduling (SPS) PDSCH.

Optionally, the above-mentioned terminal device is a terminal device in the NTN system, and the above-mentioned network device is a network device in the NTN system.

In a case that a terminal device receives a first PDSCH transmitted by a network device by scheduling a first HARQ process, the terminal device does not expect to receive a second PDSCH transmitted by the network device by scheduling the first HARQ process again before the first moment.

Illustratively, for the case where the first moment is the transmission end moment of receiving by the network device the first HARQ-ACK feedback information corresponding to the first PDSCH sent by the terminal device, in FIG. 7, the first moment may be the end moment of the slot n+18 in the uplink slots of the network device. That is, the network device no longer transmits a second PDSCH by scheduling the HARQ process x to the terminal device before the end moment of slot n+18 in the uplink slots of the network device, then the earliest slot at which the terminal device may receive again the second PDSCH transmitted by scheduling the HARQ process x is the slot n+19 in the downlink slots of the terminal device as shown in FIG. 7.

Illustratively, for the case where the first moment is determined according to the second moment, the second moment is the transmission end moment of sending the first PDSCH by the network device, and the second moment is a moment in a downlink slot of the network device, the second moment in FIG. 7 may be the end moment of slot n in the downlink slots of the network device. It can be determined that the first moment is the end moment of slot n+18 in the uplink slots of the network device according to the end moment of slot n in the downlink slots of the network device and a second duration (where the second duration is determined according to the value of K1, and/or, an offset parameter), where two possible cases are included: if K1 is 18, the first moment is determined according to the end moment of slot n in the downlink slots of the network device and a second duration of 18 slots, which is determined by K1; if K1 is 5 and the offset parameter is 13, the first moment is determined according to the end moment of slot n of the downlink slots of the network device and a second duration of 18 slots, which is determined by K1 and the offset parameter.

In the embodiments of the present disclosure, when a terminal device receives a first PDSCH transmitted by a network device by scheduling a first HARQ process, the terminal device does not expect to receive a second PDSCH transmitted by the network device by scheduling the first HARQ process again before a first moment; where the first moment is the transmission end time of receiving by the network device the first HARQ-ARK feedback information corresponding to the first PDSCH sent by the terminal device, or the first moment is determined according to a second moment, and the second moment is a transmission end moment of sending the first PDSCH by the network device. Through this solution, the scheduling restriction of HARQ in the NTN network can be enhanced, and errors can be avoided when scheduling the HARQ process in the NTN system.

The embodiments of the present application further provides a wireless communication method, including: when a network device transmits a first PDSCH by scheduling a first HARQ process to a terminal device, the network device no longer transmits a second PDSCH to the terminal device by scheduling the first HARQ process before the end of a first time unit.

The above first time unit is the time unit in the uplink slots of the network device.

For the network device, the first time unit has the following two cases:
(1) the first time unit is a time unit of receiving by the network device first HARQ-ACK feedback information corresponding to the first PDSCH sent by the terminal device, or, the first time unit is a time unit corresponding to the end moment of receiving the first HARQ-ACK feedback information by the network device.
(2) the first time unit is determined according to a second time unit.

The second time unit is a time unit of sending the first PDSCH by the network device, or the second time unit is a time unit corresponding to the end moment of sending the first PDSCH by the network device.

Optionally, the second time unit is a time unit in the downlink slot of the network device, and the first time unit is determined according to the second time unit and a second duration.

Optionally, the second duration is determined according to HARQ feedback timing sequence information.

Optionally, the HARQ feedback timing sequence information is determined according to a K1 value and/or an offset parameter.

The offset parameter is an offset value of an uplink transmission timing sequence of the terminal device.

Optionally, the first HARQ-ACK feedback information includes: an ACK, or, a NACK.

Optionally, the first PDSCH includes at least one of the following three cases:

(1) a scheduled PDSCH;

(2) a Semi-Persistent Scheduling (SPS) PDSCH; and (3) a scheduled PDSCH and a Semi-Persistent Scheduling (SPS) PDSCH.

Optionally, the above terminal device is a terminal device in the NTN system, and the above network device is a network device in the NTN system.

In the case that a terminal device receives a first PDSCH transmitted by a network device by scheduling a first HARQ process, the terminal device does not expect to receive a second PDSCH transmitted by the network device by scheduling the first HARQ process again before the end of the first time unit.

In the embodiments of the present disclosure, in the case that a terminal device receives a first PDSCH transmitted by a network device by scheduling a first HARQ process, the terminal device does not expect to receive a second PDSCH transmitted by the network device by scheduling the first HARQ process again before a first moment; where the first moment is determined according to a second moment, and the second moment is a transmission end moment of sending first hybrid automatic repeat request acknowledgement (HARQ-ACK) feedback information corresponding to the first PDSCH from the terminal device to the network device, or the second moment is a transmission end moment of receiving the first PDSCH by the terminal device. Through this solution, the scheduling restriction of HARQ in the NTN network can be enhanced, and errors when scheduling the HARQ process in the NTN system can be avoided.

In the NR system, the terminal device may be configured with a downlink semi-persistent scheduling (SPS) configuration resource, and may determine whether to perform SPS PDSCH transmission on the SPS configuration resource through activation and deactivation signaling.

Optionally, one or more downlink SPS configuration resources may be configured in one cell group.

If the terminal device is configured and activates downlink SPS transmission, then the terminal device receives the SPS PDSCH sent by the network device on the downlink SPS configuration resource, where the SPS PDSCH is periodically transmitted on the downlink SPS configuration resource, and the SPS PDSCH does not have a corresponding PDCCH scheduling.

The HARQ process number associated with the SPS PDSCH is obtained according to the slot where the downlink SPS configuration resource is located, including at least one of the following possible cases:

(1) The SPS resource configured by Rel-15:

HARQ process number=[floor(current slot*10/(number of slots included in each frame*first period))] mod the number of HARQ processes.

The current slot=[SFN*the number of slots included in each frame +the slot number in the frame].

(2) The SPS resource configured by Rel-16:

HARQ process number=[floor(current slot/second period)] mod the number of HARQ processes +offset value of HARQ process number.

The current slot=[SFN*the number of slots included in each frame +the slot number in the frame].

The SFN refers to a cell system frame number.

The number of slots included in each frame is determined according to the subcarrier spacing, for example, when the subcarrier spacing is 15 kHz, each frame includes 10 slots, when the subcarrier spacing is 30 kHz, each frame includes 20 slots, and when the subcarrier spacing is 60 kHz, each frame includes 40 slots.

The aforementioned number of HARQ processes, the first period, the second period, and the offset value of the HARQ process number may be configured by high-layer signaling. The value range of the number of HARQ processes is 1-8; the unit of the first period is ms, and the minimum configuration period is 10 ms; the unit of the second period is slot, and the minimum configuration period is 1 slot; and the value range of the offset value of the HARQ process number is 0-15.

The SPS resources configured in the NTN system may include at least one of the following possible cases:

The first possible case:

In some possible implementation manner, HARQ process number=[floor(current slot*10/(number of slots included in each frame*first period))] mod the number of HARQ processes.

The current slot=[SFN*the number of slots included in each frame+the slot number in the frame].

Optionally, the number of slots included in each frame is determined according to the subcarrier spacing, for example, when the subcarrier spacing is 15 kHz, each frame includes 10 slots, when the subcarrier spacing is 30 kHz, each frame includes 20 slots, and when the subcarrier spacing is 60 kHz, each frame includes 40 slots. The number of HARQ processes and the first period are configured by high-layer signaling.

Optionally, the value range of the number of HARQ processes is 1-8.

Optionally, the unit of the first period is millisecond (ms).

Optionally, the minimum configuration period of the first period is (10+third duration) milliseconds.

The second possible case:

In some possible implementation manner, HARQ process number=[floor(current slot*10/(number of slots included in each frame*(first period+ third duration)))] mod the number of HARQ processes.

The number of slots included in each frame is determined according to the subcarrier spacing, for example, when the subcarrier spacing is 15 kHz, each frame includes 10 slots, when the subcarrier spacing is 30 kHz, each frame includes 20 slots, and when the subcarrier spacing is 60 kHz, each frame includes 40 slots. The number of HARQ processes and the first period are configured by high-layer signaling.

Optionally, the value range of the number of HARQ processes is 1-8.

Optionally, the unit of the first period is millisecond (ms).

Optionally, the minimum configuration period of the first period is 10 milliseconds.

The third possible case:

In some possible implementation manner, HARQ process number=[floor(current slot/second period)] mod the number of HARQ processes+ offset value of HARQ process number.

The current slot=[SFN*the number of slots included in each frame+the slot number in the frame].

The number of slots included in each frame is determined according to the subcarrier spacing, for example, when the subcarrier spacing is 15 kHz, each frame includes 10 slots, when the subcarrier spacing is 30 kHz, each frame includes 20 slots, and when the subcarrier spacing is 60 kHz, each frame includes 40 slots. The number of HARQ processes, the second period, and the offset value of the HARQ process number are configured by high-layer signaling.

Optionally, the value range of the number of HARQ processes is 1-16.

Optionally, the value range of the offset value of HARQ process number is 0-15.

Optionally, the unit of the second period is a slot.

Optionally, the minimum configuration period of the second period is (1+fourth duration) slots.

Optionally, the HARQ process number is greater than or equal to the offset value of HARQ process number and less than the sum of the offset value of HARQ process number and the number of HARQ processes. For example, if the offset value of HARQ process number is 5 and the number of HARQ processes is 6, then the HARQ process number is greater than or equal to 5 and less than 11, that is, the HARQ process number includes HARQ processes 5, 6, 7, 8, 9, and 10.

The fourth possible case:

In some possible implementation manner, HARQ process number=[floor(current slot/(second period+fourth duration))] mod the number of HARQ processes+offset value of HARQ process number.

The current slot=[SFN*the number of slots included in each frame+the slot number in the frame].

The number of slots included in each frame is determined according to the subcarrier spacing, for example, when the subcarrier spacing is 15 kHz, each frame includes 10 slots, when the subcarrier spacing is 30 kHz, each frame includes 20 slots, and when the subcarrier spacing is 60 kHz, each frame includes 40 slots. The number of HARQ processes, the second period, and the offset value of HARQ process number are configured by high-layer signaling.

Optionally, the value range of the number of HARQ processes is 1-16.

Optionally, the value range of the offset value of HARQ process number is 0-15.

Optionally, the unit of the second period is a slot.

Optionally, the minimum configuration period of the second period is 1 slot.

Optionally, the HARQ process number is greater than or equal to the offset value of HARQ process number and less than the sum of the offset value of HARQ process number and the number of HARQ processes.

In the above four possible cases:

Optionally, the unit of the third duration is millisecond.

Optionally, the third duration is determined according to the offset parameter $K_{offset}$.

Optionally, the third duration is preset or determined according to indication information of the network device.

Optionally, the unit of the fourth duration is a slot.

Optionally, the fourth duration is determined according to the offset parameter $K_{offset}$.

Optionally, the fourth duration is preset or determined according to indication information of the network device.

Figure 8B:
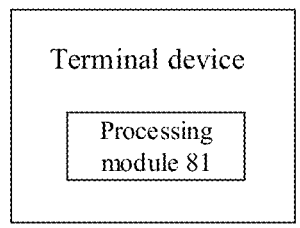
FIG. 8B is a schematic structural diagram of a terminal device provided by the embodiments of the present application.

Corresponding to at least one method in the foregoing embodiments that are applied to the terminal device, the embodiments of the present application further provides one or more terminal devices. The terminal device of the embodiment of the present application may implement any implementation manner in the above methods. As shown in FIG. 8B, the embodiments of the present application provides a terminal device, including: a processing module 81, configured to, in a case that a terminal device receives a first physical downlink shared channel (PDSCH) transmitted by a network device by scheduling a first hybrid automatic repeat request (HARQ) process, not expect by the terminal device to receive a second PDSCH transmitted by the network device by scheduling the first HARQ process again before a first moment;

where the first moment is determined according to a second moment, and the second moment is a transmission end moment of sending first hybrid automatic repeat request acknowledgement (HARQ-ACK) feedback information corresponding to the first PDSCH from the terminal device to the network device, or the second moment is a transmission end moment of receiving the first PDSCH by the terminal device.

Optionally, the second moment is the transmission end moment of sending the first HARQ-ACK feedback information corresponding to the first PDSCH from the terminal device to the network device, where the second moment is a moment in an uplink slot of the terminal device, and the first moment is a moment in a downlink slot of the terminal device corresponding to the second moment.

Optionally, the second moment advances the first moment by a time length of a length of timing advance (TA).

Optionally, the second moment is the transmission end moment of sending the first HARQ-ACK feedback information corresponding to the first PDSCH from the terminal device to the network device; and the first moment is determined according to the second moment and a first duration.

Optionally, the second moment is a moment in an uplink slot of the terminal device, and/or the first moment is a moment in an uplink slot of the terminal device.

Optionally, the first duration is determined according to first information, and the first information includes at least one of the following:

a length of TA, an offset parameter and a Round Trip Time (RTT);

where the offset parameter is a slot offset of the uplink slot of the terminal device relative to a downlink slot of the terminal device, or, the offset parameter is an offset value of an uplink transmission timing sequence of the terminal device.

Optionally, the first information is preset, or, the first information is determined according to first indication information of the network device.

Optionally, the first duration is preset, or, the first duration is determined according to second indication information of the network device.

Optionally, the second moment is the transmission end moment of receiving the first PDSCH by the terminal device, where the second moment is a moment in a downlink slot of the terminal device, and the first moment is determined according to the second moment and a second duration.

Optionally, the first moment is a moment in a downlink slot of the terminal device, and the second duration is determined according to HARQ feedback timing sequence information.

Optionally, the HARQ feedback timing sequence information is determined according to a K1 value and/or an offset parameter;

where the offset parameter is a slot offset of an uplink slot of the terminal device relative to the downlink slot of the terminal device, or, the offset parameter is an offset value of an uplink transmission timing sequence of the terminal device.

Optionally, the first HARQ-ACK feedback information includes:

an acknowledgment (ACK), or a negative acknowledgment (NACK).

Optionally, the first PDSCH includes a scheduled PDSCH;

and/or, the first PDSCH includes a Semi-Persistent Scheduling (SPS) PDSCH.

Optionally, the terminal device is a terminal device in an NTN system.

Figure 9:
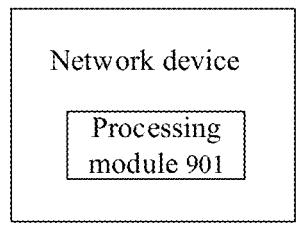
FIG. 9 is a schematic structural diagram of a network device provided by the embodiments of the present application.

Corresponding to at least one method in the foregoing embodiments that are applied to the network device, the embodiments of the present application further provides one or more network devices. The network device in the embodiments of the present application may implement any implementation manner in the foregoing methods. As shown in FIG. 9, the embodiments of the present application provides a network device, including:

a processing module 901, configured to, in a case that a network device transmits a first PDSCH by scheduling a first HARQ process to a terminal device, no longer transmit by the network device a second PDSCH to the terminal device by scheduling the first HARQ process before a first moment;

where the first moment is a transmission end moment of receiving first HARQ-ACK feedback information corresponding to the first PDSCH by the network device from the terminal device, or, the first moment is determined according to a second moment, where the second moment is a transmission end moment of sending the first PDSCH by the network device.

Optionally, the first moment is a moment in an uplink slot of the network device.

Optionally, the first moment is determined according to the second moment, and the second moment is the transmission end moment of sending the first PDSCH by the network device;

where the second moment is a moment in a downlink slot of the network device, and the first moment is determined according to the second moment and a second duration.

Optionally, the second duration is determined according to HARQ feedback timing sequence information.

Optionally, the HARQ feedback timing sequence information is determined according to a K1 value and/or an offset parameter;

where the offset parameter is an offset value of an uplink transmission timing sequence of the terminal device.

Optionally, the first HARQ-ACK feedback information includes:

an acknowledgment (ACK), or a negative acknowledgment (NACK).

Optionally, the first PDSCH includes a scheduled PDSCH;

and/or, the first PDSCH includes a Semi-Persistent Scheduling (SPS) PDSCH.

Optionally, the network device is a network device in an NTN system.

The embodiments of the present application further provides a network device, including: a memory storing executable program codes;

a processor coupled to the memory;

where the processor calls the executable program code stored in the memory to execute the method for transmitting clock information performed by the network device in the embodiments of the present disclosure.

Figure 10:
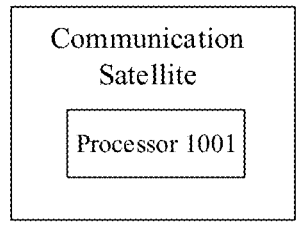
FIG. 10 is a schematic structural diagram of a base station provided by the embodiments of the present application.

As shown in FIG. 10, the network device in the embodiments of the present disclosure may be a communication satellite, and the communication satellite may include: a processor 901, the processor 1001 may implement each process implemented by the network device in the above method embodiments, and achieve the same technical effect, which will not be repeated herein.

The embodiments of the present disclosure further provides a terminal device, including: a memory storing executable program codes;

a processor coupled to the memory;

where the processor calls the executable program code stored in the memory to execute the method for transmitting clock information performed by the network device in the embodiments of the present disclosure.

Figure 11:
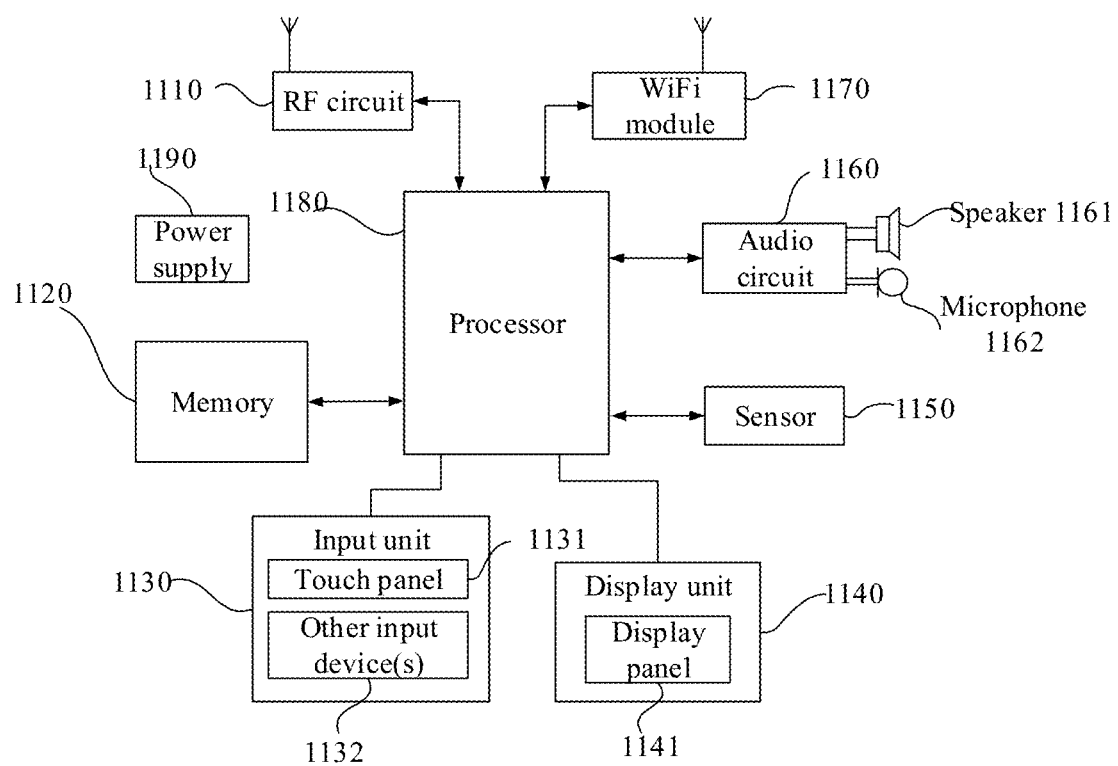
FIG. 11 is a schematic structural diagram of a mobile phone provided by the embodiments of the present application.

Illustratively, the terminal device in the embodiments of the present application may be a mobile phone. As shown in FIG. 11, the mobile phone may include: a radio frequency (RF) circuit 1110, a memory 1120, an input unit 1130, a display unit 1140, a sensor 1150, an audio circuit 1160, a wireless fidelity (WiFi) module 1170, a processor 1180, a power supply 1190 and other components, where the radio frequency circuit 1110 includes a receiver 1111 and a transmitter 1112. It will be understood by those skilled in the art that the structure of the mobile phone illustrated in FIG. 11 does not constitute a limitation of the mobile phone and may include more or fewer components than illustrated, or combine certain components, or include a different arrangement of components.

The RF circuit 1110 may be used for receiving and sending signals during a process of sending and receiving information or a call, and particularly, after receiving the downlink information of the base station, the processor 1180 processes the downlink information. In addition, the designed uplink data is sent to the base station by the RF circuit 1110. Generally, the RF circuit 1110 includes, but is not limited to, an antenna, at least one amplifier, a transceiver, a coupler, a low noise amplifier (LNA) a duplexer, and the like. In addition, the RF circuitry 1110 may also communicate with networks and other devices via wireless communications. The above wireless communication may use any communication standard or protocol, including but not limited to global system of mobile communication (GSM), general packet radio service (GPRS), code division multiple access (CDMA), wideband code division multiple access (WCDMA), long term evolution (LTE), e-mail, short messaging service (SMS), etc.

The memory 1120 can be used to store software programs and modules, and the processor 1180 executes various functional applications and data processing of the mobile phone by running the software programs and modules stored in the memory 1120. The memory 1120 may mainly include a program storage area and a data storage area, where the program storage area may store an operating system, application program required by at least one function (such as a sound playback function, an image playback function, etc.); the data storage area may store data created according to the use of the mobile phone (such as audio data, phonebook, etc.) and the like. In addition, the memory 1120 may include a high-speed random access memory, and may also include a non-volatile memory, such as at least one magnetic disk storage component, flash memory component, or other volatile solid-state storage components.

The input unit 1130 may be used to receive input numbers or character information, and generate key signal input related to user settings and function control of the mobile phone. Specifically, the input unit 1130 may include a touch panel 1131 and other input devices 1132. The touch panel 1131, also referred to as a touch screen, may collect touch operations of the user (e.g., the user's operation on or near the touch panel 1131 using any suitable object or attachment such as a finger, stylus, etc.) and drives the corresponding connection apparatus according to a predetermined program. Optionally, the touch panel 1131 may include two parts, a touch detection apparatus and a touch controller. The touch detection apparatus detects the user's touch orientation and detects the signal brought by the touch operation, and sends the signal to the touch controller; the touch controller receives the touch information from the touch detection apparatus and converts it into contact coordinates, and then sends them to the processor 1180, and the touch controller may receive commands from the processor 1180 and execute them. In addition, the touch panel 1131 may be implemented in various types such as resistive, capacitive, infrared, and surface acoustic wave. In addition to the touch panel 1131, the input unit 1130 may also include other input devices 1132. Specifically, other input devices 1132 may include but not limited to one or more of a physical keyboard, function keys (such as volume control keys, switch keys, etc.), trackball, mouse, joystick, etc.

The display unit 1140 may be used to display information entered by or provided to the user and various menus of the phone. The display unit 1140 may include a display panel 1141, and optionally, the display panel 1141 may be configured in the form of a liquid crystal display (LCD), an organic light-emitting diode (OLED), or the like. Further, the touch panel 1131 may cover the display panel 1141, and when the touch panel 1131 detects a touch operation on or near it, it is transmitted to the processor 1180 to determine the type of touch event, and subsequently the processor 1180 provides a corresponding visual output on the display panel 1141 based on the type of touch event. Although in FIG. 11, the touch panel 1131 and the display panel 1141 are used as two independent components to implement the input and input functions of the mobile phone, in some embodiments, the touch panel 1131 may be integrated with the display panel 1141 to implement the input and output functions of the mobile phone.

The mobile phone may also include at least one sensor 1150, such as a light sensor, a motion sensor, and other sensors. Specifically, the light sensor may include an ambient light sensor and a proximity sensor, where the ambient light sensor may adjust the brightness of the display panel 1141 according to the brightness of the ambient light, and the proximity sensor may turn off the display panel 1141 and/or backlight when the mobile phone is moved to the ear. As one kind of motion sensor, the accelerometer sensor may detect the magnitude of acceleration in various directions (generally in three axes), and may detect the magnitude and direction of gravity when it is stationary, and may be used for applications that recognize the posture of mobile phones (such as switching horizontal and vertical screens, related games, magnetometer attitude calibration), vibration recognition related functions (such as pedometer, tap), etc. As for other sensors such as gyroscopes, barometers, hygrometers, thermometers, and infrared sensors that may also be configured on the mobile phone, details will not be repeated here.

The audio circuit 1160, the speaker 1161, and the microphone 1162 can provide an audio interface between the user and the mobile phone. The audio circuit 1160 may transmit the electrical signal converted from the received audio data to the speaker 1161, and the speaker 1161 converts it into an audio signal for output. On the other hand, the microphone 1162 converts the collected sound signal into an electrical signal, which is converted into audio data after being received by the audio circuit 1160, the audio data is then output to the processor 1180 for processing, and then sent to, for example, another mobile phone through the RF circuit 1110. Alternatively, the audio data is output to memory 1120 for further processing.

WiFi is a short range wireless transmission technology. Through the WiFi module 1170, the mobile phone may help the user to send and receive e-mail, browse the web and access streaming media, etc., which provides the user with wireless broadband Internet access. Although FIG. 11 shows a WiFi module 1170, it can be understood that it is not an essential component of the mobile phone, and may be completely omitted as required without changing the essence of the application.

The processor 1180 is the control center of the mobile phone and uses various interfaces and lines to connect various parts of the entire mobile phone. The processor 1180 performs various functions of the mobile phone and processes data by running or executing software programs and/or modules stored in the memory 1120, and by calling data stored in the memory 1120, thereby providing overall monitoring to the mobile phone. Optionally, the processor 1180 may include one or more processing units. Preferably, the processor 1180 may integrate an application processor and a modem processor, where the application processor mainly handles the operating system, user interface, and applications, etc., and the modem processor mainly handles wireless communications. It will be appreciated that the above modem processor may not be integrated into the processor 1180.

The mobile phone also includes a power supply 1190 (such as a battery) for supplying power to various components. Preferably, the power supply may be logically connected to the processor 1180 through the power management system, so that functions such as charging, discharging, and power consumption management can be realized through the power management system. Although not shown, the mobile phone may also include a camera, a Bluetooth module, etc., which will not be described herein.

In the embodiments of the present disclosure, the processor 1180 may also implement various processes implemented by the terminal device in the foregoing method embodiments, and achieve the same technical effect, which will not be repeated here.

The embodiments of the present disclosure further provide a computer-readable storage medium, including: computer instructions, when the computer instructions are run on a computer, causing the computer to execute various processes of the terminal device in the foregoing method embodiments.

The embodiments of the present disclosure further provide a computer-readable storage medium, including: computer instructions, when the computer instructions are run on a computer, causing the computer to execute various processes of the network device in the foregoing method embodiments.

The embodiments of the present disclosure further provide a computer program product, including: computer instructions, when the computer program product is run on a computer, the computer runs the computer instructions, so that the computer executes various processes of the terminal device in the above method embodiments.

The embodiments of the present disclosure further provide a computer program product, including: computer instructions, when the computer program product is run on a computer, the computer runs the computer instructions, so that the computer executes various processes of the network device in the above method embodiments.

The embodiments of the present disclosure further provide a chip, the chip is coupled with the memory in the terminal device, so that the chip calls the program instructions stored in the memory during operation, so that the terminal device executes various processes of the terminal device in the above method embodiments.

The embodiments of the present disclosure further provide a chip, the chip is coupled with the memory in the network device, so that the chip calls the program instructions stored in the memory during operation, so that the network device executes various processes of the network device in the above method embodiments.

All or part of the above embodiments may be implemented by software, hardware, firmware or any combination thereof. When implemented using software, it may be implemented in whole or in part in the form of a computer program product. The computer program product includes one or more computer instructions. When the computer program instructions are loaded and executed on the computer, the processes or functions according to the embodiments of the present disclosure will be generated in whole or in part. The computer may be a general purpose computer, a special purpose computer, a computer network, or other programmable apparatus. The computer instructions may be stored in a computer-readable storage medium or transmitted from one computer-readable storage medium to another computer-readable storage medium. For example, the computer instructions may be transmitted from one website site, computer, server, or data center to another website site, computer, server, or data center via wired (e.g., coaxial cable, fiber optic, Digital Subscriber Line (DSL)) or wireless (e.g., infrared, wireless, microwave, etc.) manners. The computer-readable storage medium may be any available medium that may be accessed by a computer, or a data storage device such as a server or a data center with one or more available media. The available medium may be a magnetic medium (such as a floppy disk, a hard disk, or a magnetic tape), an optical medium (such as a DVD), or a semiconductor medium (such as a Solid State Disk (SSD)) and the like.

The terms "first", "second", "third", "fourth", etc. (if present) in the specification and claims of the present disclosure and in the accompanying drawings above are used to distinguish similar objects and are not necessarily used to describe a specific order or sequence. It is to be understood that the terms used in this manner are interchangeable under appropriate circumstances such that the embodiments described herein can be practiced in sequences other than those illustrated or described herein. Furthermore, the terms "comprising" and "having", as well as any variations thereof, are intended to cover a non-exclusive inclusion. For example, a process, method, system, product or device including a sequence of steps or units is not necessarily limited to the steps or units expressly listed, but may include other steps or units not clearly listed or inherent to the process, method, product or device.

What is claimed is:

1. A wireless communication method, comprising:
   in a case that a terminal device receives a first physical downlink shared channel (PDSCH) transmitted by a network device scheduling a first hybrid automatic repeat request (HARQ) process, the terminal device receives no a second PDSCH transmitted by the network device scheduling the first HARQ process again before a first point in time;
   wherein the terminal device receives the second PDSCH transmitted by the network device scheduling the first HARQ process again in the earliest slot after the first point in time; and
   wherein the first point in time is a sum of a second point in time and a Round Trip Time RTT), and the second moment is a transmission end point in time of sending first hybrid automatic repeat request acknowledgement (HARQ-ACK) feedback information corresponding to the first PDSCH from the terminal device to the network device, and wherein the RTT is determined according to first indication information of the network device.

2. The method according to claim 1, wherein the first HARQ-ACK feedback information comprises:
   an acknowledgment (ACK), or a negative acknowledgment (NACK).

3. The method according to claim 1, wherein one or more of the following:
   the first PDSCH comprises a scheduled PDSCH; and
   the first PDSCH comprises a Semi-Persistent Scheduling (SPS) PDSCH.

4. A terminal device, comprising:
   a processor, a memory, and a computer program stored on the memory and operable on the processor, wherein the computer program is executed by the processor to:
   in a case that a terminal device receives a first physical downlink shared channel (PDSCH) transmitted by a network device by scheduling a first hybrid automatic repeat request (HARQ) process, the terminal device receives no second PDSCH transmitted by the network device scheduling the first HARQ process again before a first point in time;
   wherein the terminal device receives the second PDSCH transmitted by the network device scheduling the first HARQ process again in the earliest slot after the first point in time; and
   wherein the first point in time is a sum of a second point in time and a Round Trip Time (RTT), and the second moment is a transmission end point in time of sending first hybrid automatic repeat request acknowledgement (HARQ-ACK) feedback information corresponding to the first PDSCH from the terminal device to the network device, and wherein the RTT is determined according to first indication information of the network device.

5. The terminal device according to claim 4, wherein the first HARQ-ACK feedback information comprises:
an acknowledgment (ACK), or a negative acknowledgment (NACK).

6. The terminal device according to claim 4, wherein one or more of the following:
the first PDSCH comprises a scheduled PDSCH; and
the first PDSCH comprises a Semi-Persistent Scheduling (SPS) PDSCH.

7. A network device, comprising:
a processor, a memory, and a computer program stored on the memory and operable on the processor, wherein the computer program is executed by the processor to:
in a case of transmitting a first PDSCH by scheduling a first hybrid automatic repeat request (HARQ) process to a terminal device, not transmit by the network device a second PDSCH to the terminal device by scheduling the first HARQ process again before a first point in time so that the terminal device does not receive the second PDSCH before a point in time; and
transmit by the network device the second PDSCH to the terminal device in the earliest slot after the first point in time by scheduling the first HARQ process again so that the terminal device receives the second PDSCH in the earliest slot after the point in time, wherein the point in time is a sum of a transmission end point in time of sending first hybrid automatic repeat request acknowledgement, HARQ-ACK, feedback information corresponding to the first PDSCH from the terminal device to the network device and a Round Trip Time, RTT, and wherein the RTT is determined according to first indication information of the network device;
wherein the first point in time is a transmission end point in time of receiving the first HARQ-ACK feedback information corresponding to the first PDSCH by the network device from the terminal device, or, the first point in time is determined according to a second point in time, wherein the second point in time is a transmission end point in time of sending the first PDSCH by the network device.

* * * * *